United States Patent
Swvigaradoss et al.

(10) Patent No.: US 12,142,275 B2
(45) Date of Patent: Nov. 12, 2024

(54) ENABLING SPEECH INTERACTIONS ON WEB-BASED USER INTERFACES

(71) Applicant: ServiceNow, Inc., Santa Clara, CA (US)

(72) Inventors: Jebakumar Mathuram Santhosm Swvigaradoss, Hyderabad (IN); Satya Sarika Sunkara, Sangareddy (IN); Ankit Goel, Hyderabad (IN); Jason Aloia, Carlsbad, CA (US); Rishabh Verma, Palwal (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/097,443

(22) Filed: Jan. 16, 2023

(65) Prior Publication Data

US 2023/0169975 A1    Jun. 1, 2023

Related U.S. Application Data

(63) Continuation of application No. 17/025,655, filed on Sep. 18, 2020, now Pat. No. 11,594,218.

(51) Int. Cl.
*G10L 15/22* (2006.01)
*G10L 15/08* (2006.01)

(52) U.S. Cl.
CPC ............ *G10L 15/22* (2013.01); *G10L 15/08* (2013.01)

(58) Field of Classification Search
None
See application file for complete search history.

(56) References Cited

U.S. PATENT DOCUMENTS

| | | | |
|---|---|---|---|
| 6,188,985 | B1 | 2/2001 | Thrift |
| 7,036,080 | B1 | 4/2006 | James |
| 9,047,869 | B2 | 6/2015 | Moore |
| 9,996,517 | B2 | 6/2018 | Ringuette |
| 2001/0034603 | A1 | 10/2001 | Thrift et al. |
| 2002/0010586 | A1 | 1/2002 | Fumiaki |
| 2006/0235694 | A1 | 10/2006 | Cross |
| 2007/0180384 | A1* | 8/2007 | Aiello ............... G01C 21/36 704/E15.04 |

(Continued)

FOREIGN PATENT DOCUMENTS

| | | |
|---|---|---|
| EP | 2653964 | 10/2013 |
| WO | 9948088 | 9/1999 |
| WO | 03036930 | 5/2003 |

OTHER PUBLICATIONS

Barboso, Luciano, et al., "SpeechForms: From web to speech and back." Twelfth Annual Conference of the International Speech Communication Association. 2011.

(Continued)

*Primary Examiner* — Brian L Albertalli
(74) *Attorney, Agent, or Firm* — Van Pelt, Yi & James LLP

(57) ABSTRACT

One or more associated identifiers are determined based on one or more associated tag types of an interactable element of web content. The determined one or more associated identifiers are associated with the interactable element. Based on the association of the determined one or more associated identifiers with the interactable element, one of the interactable element is matched to a received speech input. An action is performed with respect to the interactable element based on the matching.

20 Claims, 5 Drawing Sheets

(56) References Cited

U.S. PATENT DOCUMENTS

| | | |
|---|---|---|
| 2009/0254346 A1 | 10/2009 | Moore |
| 2009/0298529 A1 | 12/2009 | Mahajan |
| 2014/0039885 A1 | 2/2014 | Reich |
| 2014/0350928 A1 | 11/2014 | Zeigler |
| 2015/0149168 A1 | 5/2015 | Stent |
| 2015/0212791 A1* | 7/2015 | Kumar .................... G10L 15/22 715/728 |
| 2015/0243288 A1 | 8/2015 | Katsuranis |
| 2017/0337177 A1* | 11/2017 | Maxwell, III ........ G06F 40/205 |
| 2018/0341466 A1 | 11/2018 | Upadhyay |
| 2020/0111491 A1 | 4/2020 | Guy |

OTHER PUBLICATIONS

Issar, Sunil. "A speech interface for forms on WWW." Fifth European Conference on Speech Communication and Technology. 1997.

\* cited by examiner

ENABLING SPEECH INTERACTIONS ON WEB-BASED USER INTERFACES

CROSS REFERENCE TO OTHER APPLICATIONS

This application is a continuation of U.S. patent application Ser. No. 17/025,655 entitled ENABLING SPEECH INTERACTIONS ON WEB-BASED USER INTERFACES filed Sep. 18, 2020 which is incorporated herein by reference for all purposes.

BACKGROUND OF THE INVENTION

Speech is a natural and most efficient mode of communication for many users. However, computer user interfaces often only allow interaction via a keyboard and cursor moving input methods (e.g., mouse). While some computer user interfaces do allow interaction via speech input, they are often difficult to implement for the developer with long development and deployment times.

BRIEF DESCRIPTION OF THE DRAWINGS

Various embodiments of the invention are disclosed in the following detailed description and the accompanying drawings.

DETAILED DESCRIPTION

Figure 1:
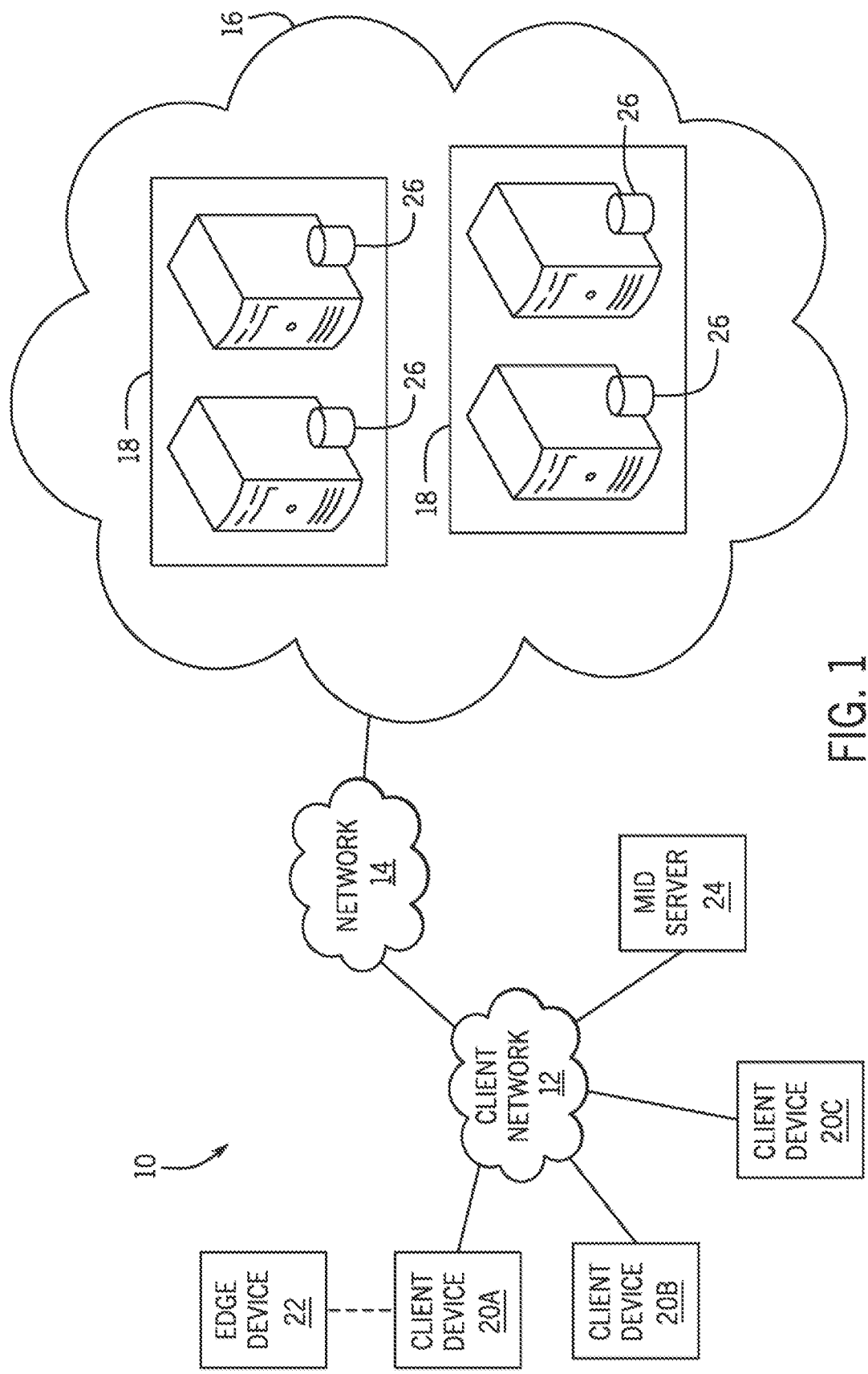
FIG. 1 is a schematic diagram of an embodiment of a computing system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

User interaction via speech is enabled on a web user interface. In some embodiments, interactable elements of a web content are identified. For example, coding of a webpage (e.g., HTML) is analyzed to identify visible elements that a user can interact with. For each of the interactable elements, one or more associated identifiers are determined and the determined identifiers are associated with corresponding ones of the interactable elements in a data structure. For example, descriptive text associated with each of the interactable elements that can be referred by a user to identify the specific interactable element is extracted from coding of the web content and associated with a reference to the corresponding interactable element in the data structure to allow quick look-up between a descriptive identifier and a corresponding interactable element. When a speech input from a user is received, one of the interactable elements is matched to the received speech input using the data structure. For example, the content from the speech input is matched (e.g., n-gram matching) to a descriptive identifier of one of the interactable elements. An action on the matched interactable element indicated by the speech input is automatically performed. For example, a link is selected for navigation, a button is selected, a textbox is filled, a checkbox is selected, a radio button is selected, an option is chosen from a dropdown menu, etc.

With the preceding in mind, the following figures relate to various types of generalized system architectures or configurations that may be employed to provide services to an organization on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, in which embodiments of the present disclosure may operate, is illustrated. The computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as a local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20A-C may be computing systems and/or other types of computing devices generally referred to as Internet of Things (IoT) devices that access cloud computing services, for example, via a web browser application or via an edge device 22 that may act as a gateway between the client devices 20A-C and the platform 16. FIG. 1 also illustrates that the client network 12 includes a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20A-C and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WIFI networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20A-C via the client network 12 and network 14. The network hosting the platform 16 provides additional computing resources to the client devices 20A-C and/or the client network 12. For example, by utilizing the network hosting the platform 16, users of the client devices 20A-C are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of servers 26 (also referred to herein as application nodes, virtual servers, application servers, virtual server instances, application instances, or application server instances), where each server 26 can be implemented on a physical computing system, such as a single electronic computing device (e.g., a single physical hardware server) or across multiple-computing devices (e.g., multiple physical hardware servers). Examples of servers 26 include, but are not limited to, a virtual server, a web server (e.g., a unitary Apache installation), an application server (e.g., a unitary Java Virtual Machine), and/or a database server.

To utilize computing resources within the platform 16, network operators may choose to configure the data centers 18 using a variety of computing infrastructures. In one embodiment, one or more of the data centers 18 are configured using a multi-instance cloud architecture to provide every customer with its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules.

In some embodiments, the cloud-based platform 16 includes one or more servers that provide web-based user interfaces (e.g., webpage user interfaces that provide access to applications for various enterprise, IT, and/or other organization-related functions). Speech interaction is enabled on these web-based user interfaces. The speech interaction may be enabled using processing performed on the server and/or the end-user client. For example, in order to enable the speech interaction on the server end, code (e.g., Javascript code) is inserted into the web content. The inserted code that enables the speech interaction may be executed by a device of the end-user client and may request processing (e.g., speech input recognition and parsing) to be performed by the server. In another example, an end-user application, a web browser, a browser plugin, extension, and/or add-on enables the speech input by overlaying speech interaction function on accessed web content. This may include serving as an intermediary that analyzes web content being displayed/provided, receiving speech input, and implementing a command of the speech on the web content as an intermediary.

Although FIG. 1 illustrates specific embodiments of a cloud computing system 10, the disclosure is not limited to the specific embodiments illustrated in FIG. 1. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. The use and discussion of FIG. 1 are only examples to facilitate ease of description and explanation and are not intended to limit the disclosure to the specific examples illustrated therein. As may be appreciated, the respective architectures and frameworks discussed with respect to FIG. 1 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 2:
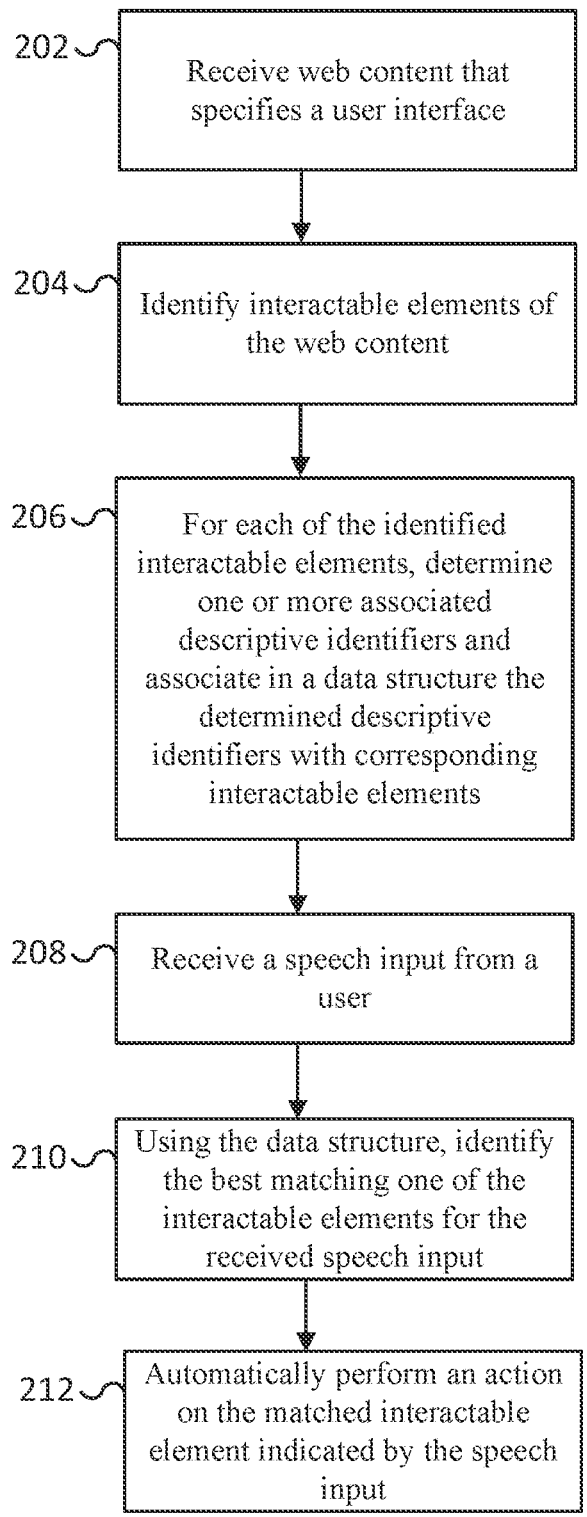
FIG. 2 is a flowchart illustrating an embodiment of a process for handling speech interaction of a web interface.

FIG. 2 is a flowchart illustrating an embodiment of a process for handling speech interaction of a web interface. The process of FIG. 2 may be at least in part implemented by any one of client devices 20A-C or any other device that may be connected to network 14 of FIG. 1. For example, a web browser or other application accessing web content may at least in part perform the process of FIG. 2. In various embodiments, at least a portion of the process of FIG. 2 is performed by an end-user application, a web browser, and/or a browser plugin or add-on.

At 202, web content that specifies a user interface is received. The web content is able to support speech interaction capability (e.g., either natively or through added functionality via added code or a web browser plugin/add-on). The web content may be a webpage or other code content received via the Internet. In some embodiments, the speech interaction capability is enabled via code included in the web content. For example, Javascript or other web program code included in the web content enables the speech interaction capability. Even if the web content was originally developed without speech interaction support, the enabling code may be dropped into the web content to support speech interactions. In some embodiments, the speech interaction capability is enabled via a web browser plugin, extension, add-on, or other browser software module that is able to access content being viewed by the web browser and provide additional functionality/capability overlaid or added to the web content.

At 204, interactable elements of the web content are identified. The interactable elements include elements that a user is able to select and/or provide input to interact with the web content. For example, a link element, a button element, a textbox element, a dropdown list element, a checkbox element, and/or a radio button element, etc. are identified. In some embodiments, only elements that are identified as to be visible are identified (e.g., hidden and not visible elements ignored and not identified). An example of the element is a M ~ujwyj}y% R fwpzu%Qfslzflj%MYR Q.% element that may have a tag, content, and one or more attributes. Identifying the elements may include analyzing the text source encoding of the web content and/or querying a document object model of the web content to identify elements that are known to be interactable. For example, the document object model of a webpage built by a web browser that has processed/parsed the web content is queried to identify elements with specific HTML tags known to be associated with interactable elements.

At 206, for each of the identified interactable elements, one or more associated descriptive identifiers are determined and the determined descriptive identifiers are associated with corresponding interactable elements in a data structure. For example, a specification of an identified interactable element is parsed and analyzed to identify text identifiers that describe or reference the element and could be used by a user to reference the element. For example, attribute content and/or tagged content in the HTML element of the interactable element is determined as the descriptive identifiers of the interactable element. These identifiers are associated with the corresponding interactable element in the data structure. For example, the data structure (e.g., database, table, array, etc.) includes key-value pair entries, and each entry includes a descriptive identifier as its key and a value (e.g., reference pointer, reference to document object model element, text specification of the interactable element, etc.) associated with the corresponding interactable element. Each different descriptive identifier of an interactable element may be a separate entry in the data structure or the different descriptive identifiers of the interactable element may be included in the same entry.

At 208, a speech input is received from a user. For example, a user speaks a command and the voice command detected by a microphone of a receiving device is recognized and converted to a text version and received. The handling of the speech input may be handled using an end-user application, a web browser, a browser plugin, extension, and/or add-on. In some embodiments, the speech input received from the user is visually indicated to the user. For example, the text version of the recognized speech input is visually shown to the user to allow the user to confirm that the speech input has been recognized correctly.

At 210, using the data structure, the best matching one of the interactable elements is identified for the received speech input. For example, the text version of the speech input is normalized and searched against descriptive identifiers of the identified interactable elements of the web content using the data structure generated in 206. A similarity score may be determined for each of the entries of the data structure, and the entry with the best similarity score that is above a threshold limit is identified as the best matching entry. The interactable element corresponding to the matching entry is determined as the best matching interactable element. In some embodiments, if more than one interactable element is tied as being a match, the user may be prompted to provide a clarification (e.g., prompt user to rephrase or provide a clarifying speech input) and the process returns back to 208.

At 212, an action is automatically performed on the best matching interactable element indicated by the speech input. An eligible action (e.g., click, select, provide input text, etc.) of the matched interactable element is identified. If the eligible action is able to be performed based on the speech input, the action is performed. If the eligible action is unable to be performed from the speech input or additional input is required (e.g., text to be inputted in a text box cannot be identified in the speech input), the user may be prompted to provide a clarification or additional speech input. Then, the additional input indicated by a clarifying or additional subsequent speech input is determined and used to perform the action on the previously matched interactable element.

Figure 3:
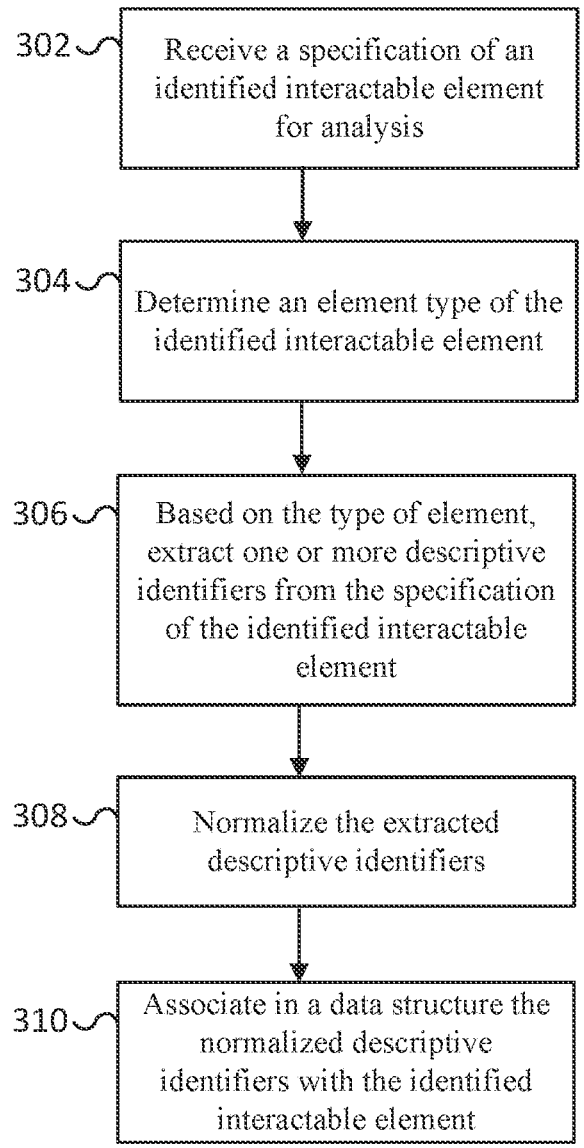
FIG. 3 is a flowchart illustrating an embodiment of a process for building a data structure cataloging interactable elements of a web content.

FIG. 3 is a flowchart illustrating an embodiment of a process for building a data structure cataloging interactable elements of a web content. The process of FIG. 3 may be at least in part implemented by any one of client devices 20A-C or any other device that may be connected to network 14 of FIG. 1. For example, a web browser or other application accessing web content may at least in part perform the process of FIG. 3. In various embodiments, at least a portion of the process of FIG. 3 is performed by an end-user application, a web browser, and/or a browser plugin or add-on. In some embodiments, at least a portion of the process of FIG. 3 is performed in 206 of FIG. 2. In some embodiments, the process of FIG. 3 is repeated for each interactable element of the web content identified in 204 of FIG. 2. In some embodiments, step 204 of FIG. 2 is performed when the web content is loaded (e.g., webpage loaded) and the process of FIG. 3 is repeated for each identified interactable element identified in 204. In some embodiments, step 204 of FIG. 2 is performed again after each user interaction with the web content and the process of FIG. 3 is repeated for each identified interactable element identified each time in 204. For example, after a user interacts an interactable element of the web content or an action is automatically performed on an interactable element of the web content, the step 204 of FIG. 2 is performed again to identify any new interactable elements and any changes to the previously identified interactable elements.

At 302, a specification of an identified interactable element is received for analysis. In some embodiments, the specification of the identified interactable element is a specification text of a web element (e.g., an HTML, element). For example, text of content including and between an opening tag to a closing tag specifying the interactable element is received. In some embodiments, the specification of the identified interactable element was obtained by analyzing the text source encoding of the web content and/or by querying a document object model of the web content (e.g., using JavaScript Query-Selector).

At 304, an element type is determined for the identified interactable element. For example, the HTML or other programming/encoding language tag of the element specifies the type of element and the element type is identified by matching the tag and/or its role attribute to known element types. By knowing the type (e.g., tag type) of element, specific parsing or analysis rules can be invoked for the element. Examples of the types of interactable elements include a link element (e.g., "a" tag identified), a button element (e.g., "button" tag identified), a textbox element (e.g., "input" tag with "text" in a role/type attribute or "textarea" tag identified), a checkbox element (e.g., "input" tag with "checkbox" in a role/type attribute identified), a radio button element (e.g., "input" tag with "radio" in a role/type attribute identified), or a dropdown list element (e.g., "select" tag identified).

At 306, based on the type of element, one or more descriptive identifiers are extracted from the specification of the identified interactable element. For example, text identifiers that describe or reference the element and could be used by a user to reference the element are identified. Examples of the descriptive identifiers include attribute content and/or tagged content in an HTML, element of the interactable element. An example of attribute content includes content specified within an HTML opening tag within quotes after an attribute identifier and an "=" (e.g., the "content" in <a aria-label="content">). In some embodiments, certain attributes are known to specify descriptive identifiers of interest and the descriptive identifier is extracted from attribute content of certain attributes. Examples of attributes of interest include aria-label, title, name, placeholder, or any other attribute known to include text that describes or references the element. An example of tagged content includes content specified between an opening tag and a closing tag (e.g., "content" in <a href="www.servicenow.com"> content </a>). In various embodiments, based on the type of element or its set of attributes, a specific corresponding parsing or analysis rule/step is invoked/performed. In some embodiments, the aria-label attribute of interactable element is identified based on other labeling elements (e.g., "label" HTML tag in the webpage). For example, content of a labeling element is extracted as a descriptive identifier.

In some embodiments, if it is detected that the identified interactable element is a link type element (e.g., "a" tag found in the specification), attribute content of any aria-label attribute is extracted as an extracted descriptive identifier and any tagged content (e.g., content specified between an opening tag and a closing tag) is also extracted as an extracted descriptive identifier. In some embodiments, if the interactable element doesn't have any tagged content, its child elements are recursively searched for any tagged content.

In some embodiments, if it is detected that the identified interactable element is a button type element, attribute content of any aria-label attribute, any title attribute, or any name attribute is extracted as one or more extracted descriptive identifiers and any tagged content (e.g., content specified between an opening tag and a closing tag) is also extracted as an extracted descriptive identifier. In some embodiments, the button type HTML, element was identified based on finding in the specification: a "button" tag; "input" tag with type attribute of "button", "submit", or "reset"; "div" tag with role attribute of "button" or an attribute of "onclick." In some embodiments, if the interactable element doesn't have any tagged content, its child elements are recursively searched for any tagged content.

In some embodiments, if it is detected that the identified interactable element is a textbox type element (e.g., "input" tag with "text" in a role/type attribute or "textarea" tag found in the specification), attribute content of any aria-label attribute, any placeholder attribute, any name attribute, or any label attribute is extracted as one or more extracted descriptive identifiers and any tagged content (e.g., content specified between an opening tag and a closing tag) is also extracted as an extracted descriptive identifier. In some embodiments, if the interactable element doesn't have any tagged content, its child elements are recursively searched for any tagged content.

In some embodiments, if it is detected that the identified interactable element is a checkbox type element (e.g., "input" tag with "checkbox" in a role/type attribute found in the specification), attribute content of any aria-label attribute, any name attribute, any value attribute, or any label attribute is extracted as one or more extracted descriptive identifiers and any tagged content (e.g., content specified between an opening tag and a closing tag) is also extracted as an extracted descriptive identifier. In some embodiments, if the interactable element doesn't have any tagged content, its child elements are recursively searched for any tagged content.

In some embodiments, if it is detected that the identified interactable element is a radio button type element (e.g., "input" tag with "radio" in a role/type attribute found in the specification), attribute content of any aria-label attribute, any name attribute, any value attribute, or any label attribute is extracted as one or more extracted descriptive identifiers and any tagged content (e.g., content specified between an opening tag and a closing tag) is also extracted as an extracted descriptive identifier.

In some embodiments, if it is detected that the identified interactable element is a dropdown list type element (e.g., "select" tag found in the specification), attribute content of any aria-label attribute or any name attribute is extracted as one or more extracted descriptive identifiers. Additionally, values of the different options included in the dropdown list are extracted as a sub class of identifiers for the dropdown list for cataloging the different options of the dropdown list (e.g., obtain "value" attributes of "option" tags under the "select" tag).

At 308, the extracted descriptive identifiers are normalized. For example, in order to make the extracted descriptive identifiers comparable and searchable with the user's speech input, special formatting, spaces and special characters (e.g., punctuation characters, line breaks, and characters included in "!"#$%&'( )*+,-./:;<=>?@[\]^_`{|}~", etc.) are removed from the identifiers, and all letter cases are changed to lowercase.

At 310, in a data structure, the normalized descriptive identifiers are associated with the identified interactable element. For example, the data structure (e.g., database, table, array, etc.) includes key-value pair entries, and each entry includes one or more normalized descriptive identifiers as its key and a value (e.g., reference to document object model entry of the corresponding interactable element, the specification of the interactable element, etc.) associated with the corresponding interactable element. Each different descriptive identifier of the interactable element may be a separate entry in the data structure or the different descriptive identifiers of the interactable element may be included in the same entry. An entry in the data structure may be associated with sub entries and/or a sub table with sub entries. For example, for the dropdown list type element, identifiers of value options of the different options of the dropdown list element are included as the sub entries.

Table 1 below is an example data structure that includes example entries of extracted descriptive identifiers and associated corresponding identified interactable elements. Entries 1 and 2 identify normalized extracted descriptive identifiers of a same link type interactable element. Entries 3 and 4 identify normalized extracted descriptive identifiers of a button type interactable element. Entries 5 and 6 identify normalized extracted descriptive identifiers of a textbox type interactable element. Entry 7 identifies a normalized extracted descriptive identifier for a checkbox type interactable element. Entries 8 and 9 identify normalized extracted descriptive identifiers of a radio button type interactable element. Entry 10 identifies a normalized extracted descriptive identifier for a dropdown list type interactable element. The identifiers of value options of the different options of this dropdown list element are included as the sub entries in the shown Table 2. Table 2 is linked to entry #10 of Table 1.

TABLE 1

| Entry # | Key | Value |
|---|---|---|
| 1 | "myhomepage" | <a href=www.servicenow.com aria-label="homepage"> My Homepage</a> |
| 2 | "homepage" | <a href=www.servicenow.com aria-label="homepage"> My Homepage</a> |
| 3 | "ordernow" | <button name="submit">Order Now</button> |
| 4 | "submit" | <button name="submit">Order Now</button> |
| 5 | "name" | <input aria-label="name" type="text" name="username" /> |
| 6 | "username" | <input aria-label="name" type="text" name="username" /> |
| 7 | "eclipseide" | <input type="checkbox" id="sp_formfield_eclipse_ide" role="checkbox" aria-label="Eclipse IDE"/> |
| 8 | "colorchoice" | <input aria-label="color choice" type="radio" name="blue" /> |
| 9 | "blue" | <input aria-label="color choice" type="radio" name="blue" /> |
| 10 | "quantity" | <select aria-label="quantity" name="quantity" /> |

TABLE 2

| Key | Value |
|---|---|
| "1" | 1 |
| "2" | 2 |
| "3" | 3 |

Figure 4:
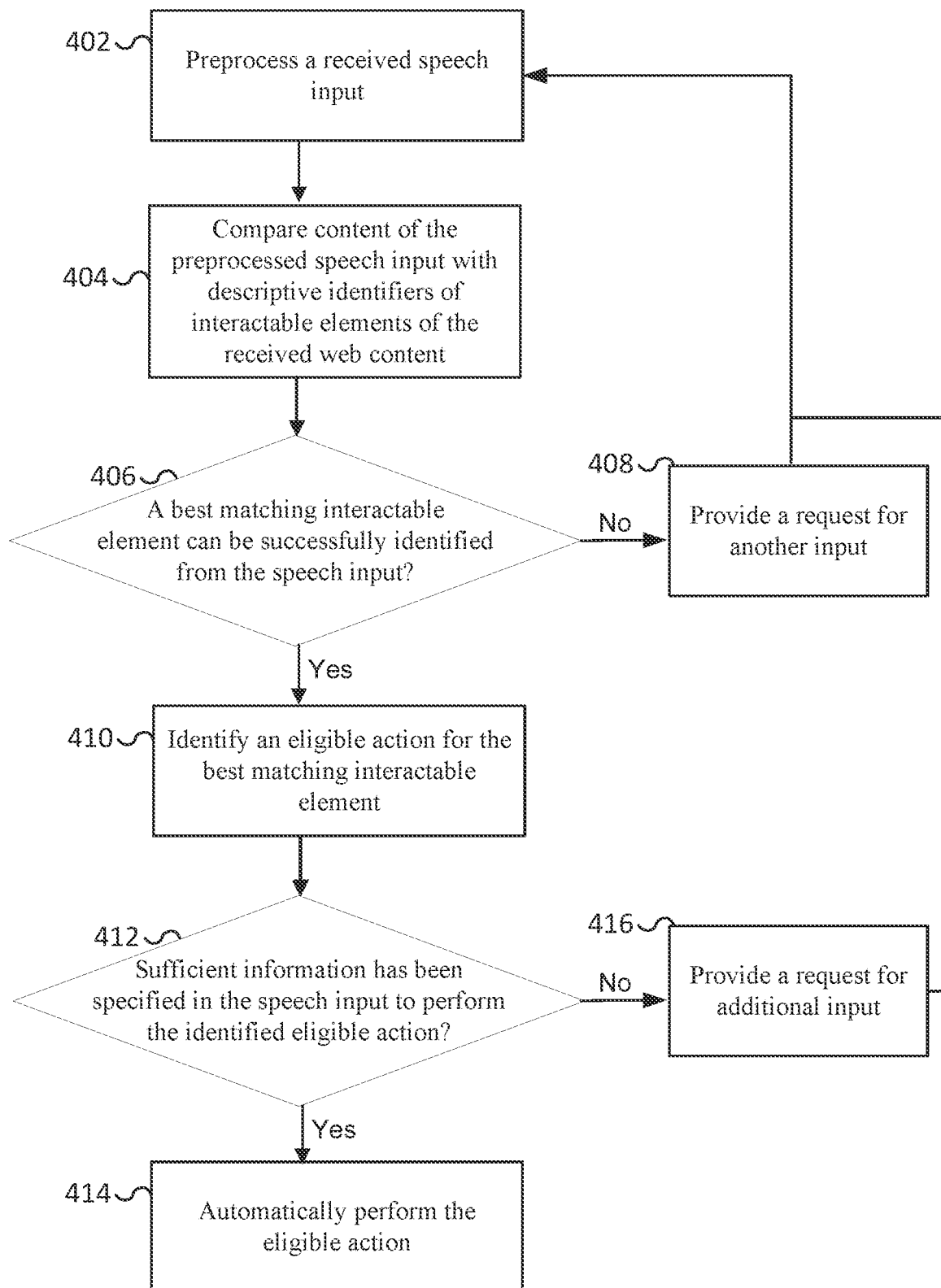
FIG. 4 is a flowchart illustrating an embodiment of a process for processing a speech input to perform a speech indicated action for a received web content.

FIG. 4 is a flowchart illustrating an embodiment of a process for processing a speech input to perform a speech indicated action for a received web content. The process of FIG. 4 may be at least in part implemented by any one of client devices 20A-C or any other device that may be connected to network 14 of FIG. 1. For example, a web browser or other application accessing web content may at least in part perform the process of FIG. 4. In various embodiments, at least a portion of the process of FIG. 4 is performed by an end-user application, a web browser, and/or a browser plugin or add-on. In some embodiments, at least a portion of the process of FIG. 4 is performed in 210 and/or 212 of FIG. 2.

At 402, a received speech input is preprocessed. For example, a user speaks a command and the voice command detected by a microphone of a receiving device is recognized and converted to a text version and received for processing. Preprocessing the speech input may include normalizing the text version of the speech. For example, the format of the content of the speech input is modified to make it comparable when used to search against identifiers of interactable elements. Examples of the modification include removing special formatting, spaces, and special characters (e.g., punctuation characters, line breaks, and characters included in "!"#$%&'( )+,–./:;<=>?@[\]^_'{|}~", etc.), and changing letter cases to lowercase. In some embodiments, preprocessing the speech input includes identifying parts of speech of the content of the speech input. For example, using natural language processing, parts of speech of the content of the speech input is determined for use in 412.

In some embodiments, if the received speech input explicitly (e.g., uses the word "this" to reference an element) or implicitly (e.g., process returned to 402 from 416) references a previously identified best matching interactable element for a previous speech input, the process proceeds to 412.

At 404, content of the preprocessed speech input is compared with descriptive identifiers of interactable elements of the received web content. In some embodiments, the normalized text of the speech input is compared/searched against descriptive identifiers (e.g., keys) of an interactable element catalog data structure generated using the process of FIG. 3. For example, for every entry in the interactable element catalog data structure, the normalized content of the speech input is compared with the descriptive identifier (e.g., key) of the data structure entry to determine a corresponding similarity score/measure.

In some embodiments, the comparison is performed using n-gram matching. For example, n-grams (e.g., 2-grams where every two unique consecutive characters is a 2-gram) are identified for the normalized content of the speech input and n-grams are identified for the descriptive identifier (e.g., key) of every entry in the interactable element catalog data structure. The similarity score/measure for an entry is based on the number of n-grams in common between the n-grams of the descriptive identifier of the data structure entry and the n-grams of the normalized content of the speech input. The similarity score/measure may be normalized to the character length of the speech input and the character length of the descriptive identifier of the data structure entry. An example formula for the similarity score is given by the formula:

$$\text{Similarity Score} = \frac{2 * \text{Number of same 2 Grams}}{\text{Length of Target} + \text{Length of Input} - 2}$$

In one specific example, if the normalized content of the speech input is "gotohome," its 2-grams are [go, ot, to, oh, ho, om, me]. An example descriptive identifier in the interactable element catalog data structure entry corresponding to a specific identified interactable element of the web content is "home" for the specific interactable element "<input aria-label="home" type="button" name="homepage"/>." The 2-grams of the "home" descriptive identifier are [ho, om, me]. Given that this identifier (length 4) of the data structure entry shares three same 2-grams with the example speech input (length 8), an example similarity score for the data structure entry is (2*3)/(4+8−2)=0.6.

At 406, it is determined whether a best matching interactable element can be successfully identified from the speech input. In some embodiments, based on the comparisons performed in 404, the matching interactable element indicated by the speech input is identified, if possible. For example, the determined similarity scores for the eligible interactable elements are analyzed and sorted to identify the interactable element with the best (e.g., highest score) similarity to the speech input as the best matching interactable element. In some embodiments, if multiple interactable elements share the same best similarity (e.g., cannot be narrowed down to a single element), it is determined that a best matching interactable element cannot be successfully identified. In some embodiments, if the interactable element with the best (e.g., highest score) similarity to the speech input has a similarity score/measure that does not meet a threshold value, it is determined that a best matching interactable element cannot be successfully identified. For example, if the similarity score/measure is below the threshold value, none of the eligible interactable elements matches the speech input enough to conclude that there exists a matching interactable element. Thus, in some embodiments, it is determined that a best matching interactable element can be successfully identified if a single eligible interactable element has the best similarity score/measure that at least meets the threshold value.

At 406, if it is determined that the best matching interactable element cannot be successfully identified from the speech input, at 408, a request for another input is provided. For example, a user is prompted to provide a rephrased speech input (e.g., via voice command or by visual message). The new (e.g., rephrased) speech is received and the process returns to 402.

At 406, if it is determined that the best matching interactable element can be successfully identified from the speech input, at 410, an eligible action for the best matching interactable element is identified. For example, the entry in the interactable element catalog data structure corresponding to the best matching interactable element includes a specification and/or a reference (e.g., as a value of the key identifier matching the speech input) to the best matching interactable element and the eligible action for the type of element identified from this specification/reference is determined. Examples of the specification/reference include a text specification or a reference to a document object model. Examples of the eligible actions include selecting/navigating a link, selecting/clicking a button, selecting/clicking a checkbox, selecting/clicking a radio button, selecting an option among dropdown list options, or inputting text into a textbox.

At 412, it is determined whether sufficient information has been specified in the speech input to perform the identified eligible action. Some identified eligible actions require an action input specification (e.g., selection among dropdown list options, input text for a textbox, etc.). If no other input content is needed to perform the action (e.g., for link, button, checkbox, and radio button type elements), it is determined that sufficient information has been specified in the speech input to perform the identified eligible action. If an action input specification is needed to perform the eligible action, the received speech input is analyzed to determine whether the action input specification has been specified in the speech input. If it has been specified, it is determined that sufficient information has been specified in the speech input to perform the identified eligible action. If it is determined that the needed action input specification cannot be identified in the received speech input, it is determined that sufficient information has not been specified in the speech input to perform the identified eligible action.

If the best matching interactable element is determined to be a dropdown list type element, a selection among options of the dropdown list needs to be specified to perform the action. In some embodiments, the normalized/processed content of the speech input is compared with the identified options of the dropdown list that has been cataloged. For example, the normalized text of the speech input is compared/searched against identifiers of dropdown list options associated with the interactable element catalog data structure entry of the best matching interactable element. These identifiers of dropdown list options may be stored in the same data structure or in a separate data structure (e.g., in Table 2 discussed earlier). A similarity score (e.g., based on n-gram matching) is determined for each dropdown list option based on a comparison of the speech input with the identifier of the dropdown list option. The dropdown list option with the best similarity score is the option specified by the speech input. The best similarity score may also need to be different from another option and be above a threshold to determine that it is a valid selection that has been identified from the speech input. For example, it is determined that sufficient information has been specified in the speech input to perform the identified eligible action for a dropdown list element if only a single dropdown list option has the best similarity score/measure that at least meets the threshold value.

If the best matching interactable element is determined to be a textbox type element, input text content to be inputted in a text box needs to be specified to perform the action. In some embodiments in order to identify any input text content in the speech input, the speech input is analyzed to determine parts of speech (e.g., noun, verb, preposition, definite/indefinite article, etc.) of each word in the speech input. All definite and indefinite articles may be filtered out. Then the character location in the speech input that is the end location/position of the portion of the speech input that at least partially matches the descriptive identifier (e.g., key) of the interactable element catalog data structure entry of the best matching interactable element is determined. For example, the end character position of the longest common string between content of the speech input and the descriptive identifier of the data structure entry for the best matching interactable element is determined. If the next word after the end position of the matching portion is a preposition part of speech, all word(s) after this preposition are identified as the input text content to be inputted in a textbox and it is determined that sufficient information has been specified. If there is no next word after the end position of the matching portion that is a preposition but there exists a verb word and a preposition word before the end position of the matching portion, word(s) between the verb word and the preposition word are identified as the input text content to be inputted in a textbox and it is determined that sufficient information has been specified. Otherwise, if there is no next word after the end position of the matching portion that is a preposition and there does not exist a verb word and a preposition word before the end position of the matching portion, it is determined that sufficient information has not been specified and input text content is needed to perform the eligible action.

In a specific example for a best matching textbox type element, the identifier/key of the interactable element catalog data structure entry is "shortdescription." If the speech input is "update short description to email setup," the end position of the portion matching the descriptive identifier is denoted by the "^" in "update short description^ to email setup." Because there is a next word after the end position of the matching portion that is a preposition (i.e., "to"), the word(s) after this preposition (i.e., "email setup") are identified as the input text content to be inputted in the textbox element. If the speech input is "fill server is down as description," the end position of the portion matching the descriptive identifier is denoted by the "^" in "Fill Server is down as description^". Because there is a verb word (i.e., "fill") and a preposition word (i.e., "as") before the end position of the matching portion, word(s) between the verb word and the preposition word (i.e., "server is down") are identified as the input text content to be inputted in the textbox element.

If at 412, it is determined that sufficient information has been specified in the speech input to perform the identified eligible action, at 414, the eligible action is automatically performed. For example, a link is selected/navigated, a button is selected/clicked, a checkbox is selected/clicked, a radio button is selected/clicked, a specified option among dropdown list options is selected, or a specified text is inputted into a textbox.

If at 412, it is determined that sufficient information has not been specified in the speech input to perform the identified eligible action, at 416, a request for additional input is provided. For example, a user is prompted (e.g., via voice command or by visual message) to provide a rephrased speech input and/or additional input content for the identified eligible action and when the user provides a new speech input the process returns back to 402 for processing the new speech input. In some embodiments, in the processing of this new speech input (e.g., the received speech input at 402 was in response to the request in 416), the process proceeds to 412 after 402 to identify in the new speech input the additional input for the previously identified eligible action for the previously identified best matching interactable element.

Figure 5:
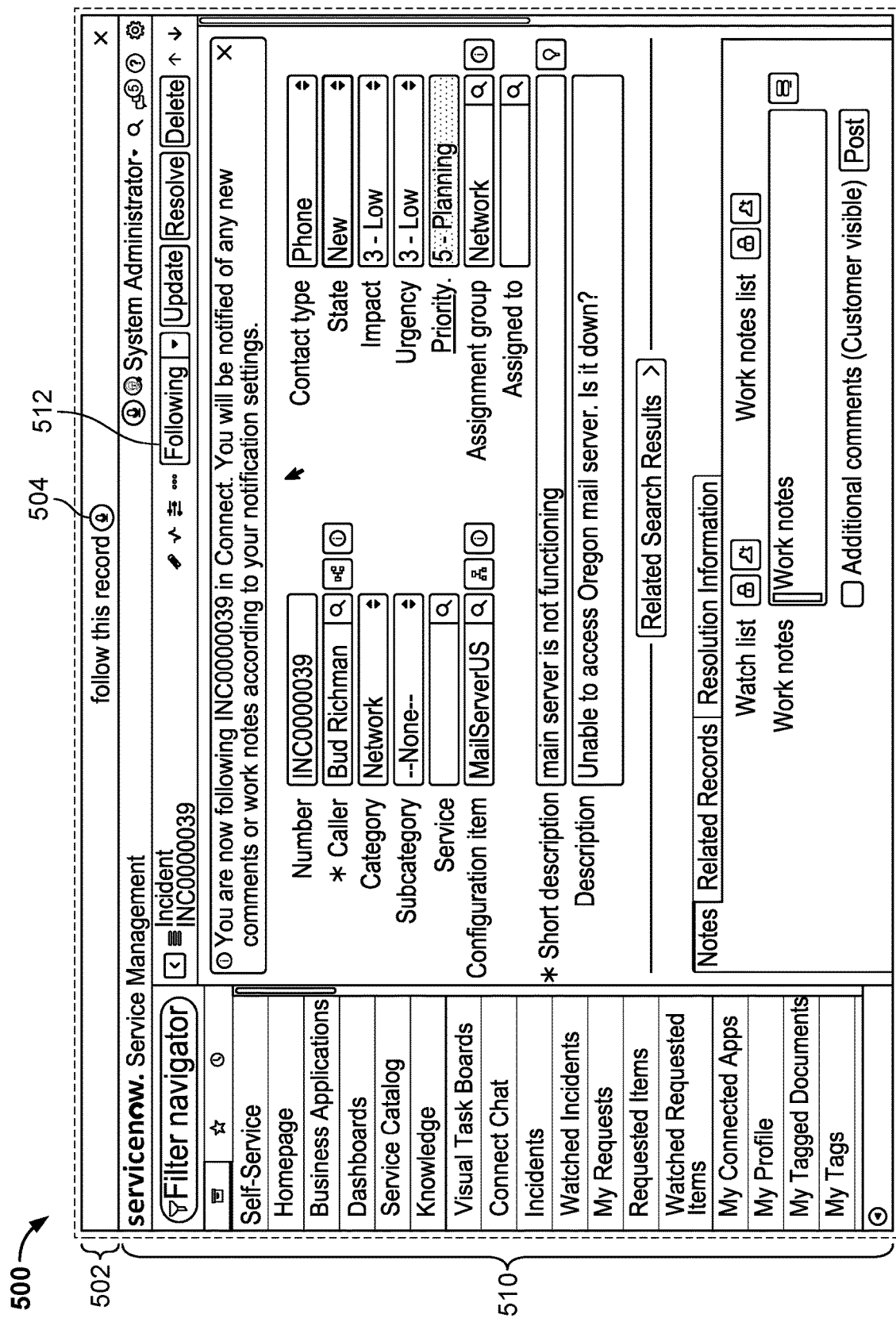
FIG. 5 is a diagram illustrating an embodiment of a user interface for providing a speech input.

FIG. 5 is a diagram illustrating an embodiment of a user interface for providing a speech input. The user interface of FIG. 5 may be at least in part implemented by any one of client devices 20A-C or any other device that may be connected to network 14 of FIG. 1. For example, a web browser or other application accessing web content may be at least in part the user interface of FIG. 5. In various embodiments, at least a portion of the user interface of FIG. 5 is provided by an end-user application, a web browser, and/or a browser plugin or add-on.

User interface 500 includes speech input UI portion 502. Speech input UI portion 502 may be provided via a web code/encoding of a webpage that has been inserted by a developer, an intermediary proxy server, and/or a web browser plugin/add-on. For example, although the webpage originally provided by a source does not provide speech input capabilities, the speech input capabilities have been added by another party by inserting code/content into the webpage to provide speech input UI portion 502 (e.g., insert a webpage frame into the original webpage for UI portion 502) and speech input handling capabilities. In another example, speech input UI portion 502 is a built-in capability of original web content. A user may select button 504 to initiate and/or stop speech input listening. In some embodiments, speech input listening is automatically enabled without selecting button 504. When a speech input is detected, the speech recognition is performed to determine a text of the content of the speech input. The recognized content is displayed in speech input UI portion 502. An end of a speech input is detected when a period of silence of sufficient length is detected or button 504 is selected. The action indicated by the speech input is performed in primary web content portion 510. In the specific example shown in FIG. 5, button 512 has been selected as the action.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining one or more associated identifiers based on one or more associated tag types of an interactable element of web content;
   associating the determined one or more associated identifiers with the interactable element;
   matching, based on the association of the determined one or more associated identifiers with the interactable element, a received speech input to the interactable element corresponding to a best element similarity score among different element similarity scores for a plurality of different interactable element candidates of the web content;
   identifying an action to be performed on the matched interactable element;
   specifically for the identified action, determining whether the speech input specifies sufficient information for the action to be performed on the matched interactable element including by comparing at least a portion of a processed version the speech input with cataloged dropdown list options stored in a dropdown list data structure linked to an entry of an interactable element data structure associated with an aria-label of the matched interactable element to determine whether a single specific matched dropdown list option has a best dropdown list option score determined to meet at least a dropdown list threshold value among a plurality of dropdown list option scores for the cataloged dropdown list options; and
   performing the action with respect to the interactable element based on the matching.

2. The method of claim 1, wherein the one or more associated identifiers are determined for adding a speech interaction user interface capability for the interactable element.

3. The method of claim 1, further comprising inserting code into the web content provided by a server from a web content source to enable a speech interaction user interface capability.

4. The method of claim 1, further comprising using a web browser plugin or add-on to enable a speech interaction user interface capability.

5. The method of claim 1, further comprising identifying the interactable element of the web content including by identifying Hypertext Markup Language (HTML) elements with tags associated with elements that a user is able to interact with.

6. The method of claim 1, further comprising identifying the interactable element of the web content including by determining not to identify non-visible Hypertext Markup Language (HTML) elements.

7. The method of claim 1, further comprising identifying the interactable element of the web content including by querying a document object model of the web content.

8. The method of claim 1, wherein the plurality of different interactable element candidates include one or more of the following elements: a link element, a button element, a textbox element, a dropdown list element, a checkbox element, or a radio button element.

9. The method of claim 1, wherein determining the one or more associated identifiers includes extracting the one or more associated identifiers from a specification of the interactable element using a rule specifically selected for the interactable element among a plurality of different rules based on a tag type of the interactable element.

10. The method of claim 1, wherein determining the one or more associated identifiers for the interactable elements includes extracting one or more attribute content or tagged content from a specification of the interactable element.

11. The method of claim 1, wherein the determined one or more associated identifiers are associated with the interactable element in a data structure.

12. The method of claim 11, further comprising storing a key-value entry in the data structure that includes a normalized version of at least one of the one or more associated identifiers as a key of the key-value entry and a reference to the interactable element as a value of the key-value entry.

13. The method of claim 11, further comprising matching the interactable element to the received speech input including by comparing content of the speech input with key values of entries in the data structure.

14. The method of claim 13, wherein comparing content of the speech input with the key values of entries in the data structure includes performing n-gram matching.

15. The method of claim 13, wherein comparing content of the speech input with the key values of entries in the data structure includes determining the element similarity score for each of the entries in the data structure for the plurality of different interactable element candidates and comparing the element similarity scores.

16. The method of claim 15, wherein matching one of the interactable element to the received speech input includes selecting the interactable element among the plurality of different interactable element candidates based on the similarity scores determined to be above an element similarity score threshold value.

17. A system, comprising:
one or more processors configured to:
determine one or more associated identifiers based on one or more associated tag types of an interactable element of web content;
associate the determined one or more associated identifiers with the interactable element;
match, based on the association of the determined one or more associated identifiers with the interactable element, a received speech input to the interactable element corresponding to a best element similarity score among different element similarity scores for a plurality of different interactable element candidates of the web content;
identify an action to be performed on the matched interactable element;
specifically for the identified action, determine whether the speech input specifies sufficient information for the action to be performed on the matched interactable element including by comparing at least a portion of a processed version the speech input with cataloged dropdown list options stored in a dropdown list data structure linked to an entry of an interactable element data structure associated with an aria-label of the matched interactable element to determine whether a single specific matched dropdown list option has a best dropdown list option score determined to meet at least a dropdown list threshold value among a plurality of dropdown list option scores for the cataloged dropdown list options; and
perform the action with respect to the interactable element based on the matching; and
a memory coupled to the one or more processors and configured to provide the one or more processors with instructions.

18. The system of claim 17, wherein determining the one or more associated identifiers includes extracting the one or more associated identifiers from a specification of the interactable element using a rule specifically selected for the interactable element among a plurality of different rules based on a tag type of the interactable element.

19. The system of claim 17, wherein determining the one or more associated identifiers for the interactable elements includes extracting one or more attribute content or tagged content from a specification of the interactable element.

20. A computer program product, the computer program product being embodied in a non-transitory computer readable storage medium and comprising computer instructions for:
determining one or more associated identifiers based on one or more associated tag types of an interactable element of web content;
associating the determined one or more associated identifiers with the interactable element;
matching, based on the association of the determined one or more associated identifiers with the interactable element, a received speech input to the interactable element corresponding to a best element similarity score among different element similarity scores for a plurality of different interactable element candidates of the web content;
identifying an action to be performed on the matched interactable element;
specifically for the identified action, determining whether the speech input specifies sufficient information for the action to be performed on the matched interactable element including by comparing at least a portion of a processed version the speech input with cataloged dropdown list options stored in a dropdown list data structure linked to an entry of an interactable element data structure associated with an aria-label of the matched interactable element to determine whether a single specific matched dropdown list option has a best dropdown list option score determined to meet at least a dropdown list threshold value among a plurality of dropdown list option scores for the cataloged dropdown list options; and
performing the action with respect to the interactable element based on the matching.

\* \* \* \* \*